United States Patent

[11] 3,627,906

[72] Inventors Robert A. Kurz
West Middlesex;
Jacob Chottiner, Mckeesport, both of Pa.
[21] Appl. No. 75,128
[22] Filed Sept. 24, 1970
[45] Patented Dec. 14, 1971
[73] Assignee Westinghouse Electric Corporation
Pittsburgh, Pa.

[54] ELECTRICAL CONDENSER BUSHING ASSEMBLY
6 Claims, 6 Drawing Figs.
[52] U.S. Cl. .................................................. 174/143,
317/242
[51] Int. Cl. .................................................. H01b 17/28
[50] Field of Search ............................................ 174/73 R,
142, 143; 317/242, 260, 261

[56] References Cited
UNITED STATES PATENTS
3,394,455 7/1968 Grimmer ........................... 174/143 X FOREIGN PATENTS
474,703 11/1937 Great Britain ................ 174/143
537,560 12/1955 Italy ............................ 174/143

Primary Examiner—Laramie E. Askin
Attorneys—A. T. Stratton, F. E. Browder and Donald R. Lackey ABSTRACT: An electrical bushing assembly of the condenser type, including an insulating body member formed of cast solid insulation, an electrical conductor, and at least One tubular capacitor plate embedded in the cast solid insulation of the body member, in spaced relation about the electrical conductor. The tubular capacitor plate is formed of a plurality of turns of electrically conductive material, with the turns being axially spaced in a predetermined pattern to provide openings in the wall of the tubular capacitor plate, through which the solid insulation of the insulating body member extends.

INVENTORS
Robert A. Kurz and
Jacob Chottiner.

ELECTRICAL CONDENSER BUSHING ASSEMBLY

BACKGROUND OF THE INVENTION

1. Field of the Invention

The invention relates in general to electrical bushings adapted for mounting through an opening in the casing of electrical apparatus, such as transformers, and more specifically to electrical bushings of the condenser type, having an insulating body portion formed of a cast, solid insulation system.

2. Description of the Prior Art

Condenser type bushings for electrical power apparatus, such as transformers and circuit breakers, commonly employ a built-up capacitor section, which includes layers of paper with metallic foil interspersed between predetermined layers thereof. The paper may be resin impregnated, which bonds the laminated section into a solid, or the paper may be oil impregnated. The capacitor section is then assembled within a metallic mounting flange and upper and lower porcelain type housings, with the space between the capacitor portion and the porcelain housing usually being filled with oil, or other suitable insulating material.

While bushings properly manufactured and assembled according to these prior art teachings are electrically suitable, they are relatively costly to manufacture. Further, proper electrical performance demands that the utmost care be taken in selecting the size of the foil and its placement, as the winding of the built-up paper section progresses. Errors by operating personnel in the selection of the size, or placement of the foils, will change the electrical stress distribution across the bushing, resulting in a bushing structure which is less than optimum.

The development of nontracking, weather-resistant, high strength resinous casting systems has enabled condenser type bushings to be cast, with the metallic foils being embedded in the cast solid insulation, such as disclosed in U.S. Pat. No. 3,394,455, which is assigned to the same assignee as the present application. Cast bushings eliminate the time consuming winding of the paper, and critical placement of the capacitor foils, as the capacitor plates and conductor studs may be placed in a mold and the mold filled with the desired liquid resin system, which is subsequently cured to a solid. The cast electrical bushing is excellent mechanically, as it is not susceptible to breakage due to shock, and it is also excellent electrically if there are no cracks, voids or air inclusions in the cast body portion, and if the capacitor plates maintain their original positions during the introduction of the liquid resin system, and subsequent curing of the resin system to a solid. This latter requirement, however, has proven to be troublesome, as the capacitor plates are relatively thin, i.e., in the range of 1.5–8 mils, and difficult to anchor in the proper position within the mold. Their positions are often altered during the introduction of the resin system into the mold, and during the subsequent curing of the resin system. Further, incomplete bonding between the capacitor plates and the resin system sometimes occurs, which mechanically weakens the assembly and causes voids which impair the bushing electrically. The voids may contain air which will ionize when the bushing is placed in service, causing radio interference, as well as a degradation of the surrounding solid insulation, which may eventually lead to failure of the bushing.

Thus, it would be desirable to eliminate the costly winding of the capacitor section of capacitor type bushings, by casting the capacitor plates within a resinous insulation system which is free of cellulosic materials. Further, it would be desirable to provide capacitor plates which have sufficient mechanical strength to insure that they will maintain their preplaced positions, without resorting to costly structures and/or thicker wall dimensions, and that the cast resin system will bond to the capacitor plates without trapping air and without producing voids between the cured resin system and the capacitor plates. Further, it would be desirable to provide capacitor plates which have the above enumerated characteristics without resorting to painting, spraying, or otherwise coating insulating structures with conductive material, which is often required in prior art structures.

SUMMARY OF THE INVENTION

Briefly, the present invention is a new and improved electrical bushing assembly having an electrical conductor, an insulating body member formed of a cast solid electrical insulating material, and at least one tubular capacitor plate embedded in the insulating body member, in spaced relation about the electrical conductor. The wall of the tubular capacitor plate is formed of a plurality of turns of electrically conductive material, with the turns being axially spaced in a predetermined pattern which provides openings through the wall. An adhesive bonds the turns together, adding the required mechanical strength to the structure, while maintaining certain of the openings in the wall of the tubular member, through which the solid insulating material of the body member extends to insure a good bond between the cast solid electrical insulating material and the capacitor plates, without producing voids or air inclusions.

In one embodiment of the invention, the capacitor plates are tubular members formed of a plurality of relatively small metallic wires, which spiral together in a collimated group, with a predetermined space between adjacent group turns. Mechanical strength is provided by bonding means disposed to bond the wires of the group together, while maintaining the opening between group turns.

In another embodiment of the invention, the capacitor plates are tubular members formed of a strip of metallic material, wound with a predetermined angle relative to a line perpendicular to the axis of the tubular member, and a predetermined space between adjacent turns. Mechanical strength is provided, while maintaining openings between the turns, by disposing bonding means between the turns at circumferentially spaced locations.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF PREFERRED EMBODIMENTS

Figure 1:
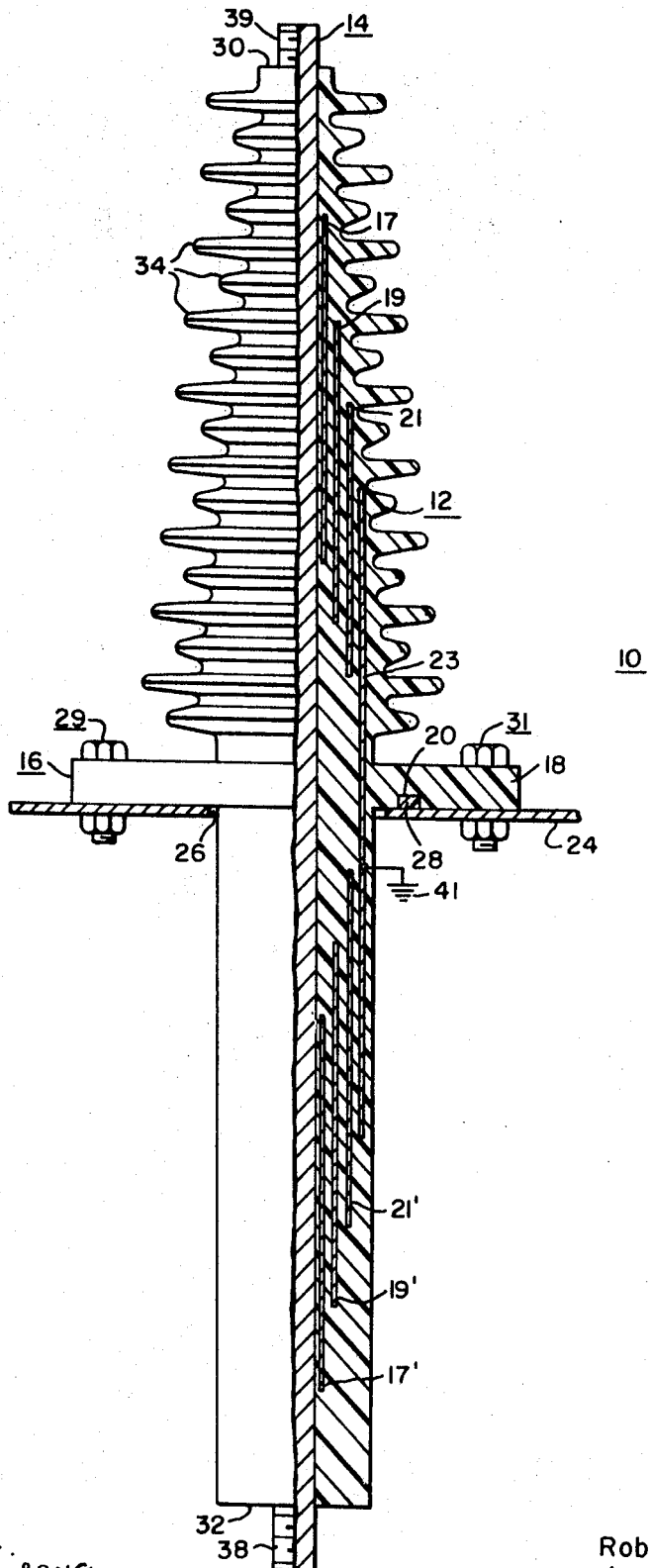
FIG. 1 is an elevational view, partially in section, of an electrical bushing of the cast, condenser type, which may be constructed according to the teachings of the invention.

Referring now to the drawings, and FIG. 1 in particular, there is shown an elevational view, partially in section, of an electrical bushing assembly 10 which may be constructed according to the teachings of the invention. In general, bushing assembly 10 includes a substantially cylindrical, elongated body member or portion 12, formed of a castable electrical insulating material, an axially disposed electrical conductor 14, mounting means 16, and a plurality of tubular capacitor plates 17, 17', 19, 19', 21, 21' and 23, which are disposed about conductor stud 14. As illustrated in FIG. 1, mounting means 16 may include a flange 18 which is an integral portion of the cast body member 12, having an annular undercut or groove 20 disposed therein, and a plurality of transverse openings (not shown) disposed through the flange for accepting mounting bolts. The flange 18, the groove 20, and the openings through the flange 18, allow bushing assembly 10 to be disposed in sealed engagement with a casing 24 of the electrical apparatus it is to be associated with, such as a transformer or a circuit breaker. For example, as shown in FIG. 1, bushing assembly 10 may be mounted perpendicularly through an opening 26 in the casing 24. A suitable gasket member 28 is disposed in the annular groove 20, and the bushing assembly 10 is fixed relative to the casing 24 by nut and bolt assemblies, such as assemblies 29 and 31, which are disposed through the openings in the flange 18, and through corresponding openings disposed about the main opening 26 in the casing 24. Or, bolts may be welded to the casing 24 which will extend upwardly through the openings disposed in the flange 18.

The electrical conductor 14, which may be copper or aluminum, forms the axially extending conductor for the bushing assembly 10, having suitable means at each end thereof, such as threads 38 and 39 at its lower and upper ends, respectively, for electrically connecting the bushing assembly 10 to the encased electrical apparatus, and externally to the associated electrical system, respectively.

Body member 12 includes first and second ends 30 and 32, respectively, and, as illustrated in FIG. 1, it may have a plurality of weather sheds 34 cast integrally therewith on the weather end of the bushing. A metallic corona shield (not shown) may be disposed at the first end 30 of body portion 12, which surrounds conductor 14 with a smooth, rounded surface, to reduce the potential gradient at the point where the conductor enters the body portion 12.

The resinous insulating material of which the body member 12 of bushing assembly 10 is formed may be any suitable thermosetting resin. Or, if the softening temperature of the resin system is high enough, a thermoplastic resin system may be used. The resinous polymeric epoxides have been found to be excellent in forming bushings of this type, possessing good physical strength, good weather resistant characteristics, relatively low shrinkage upon curing, good adherence to metallic inserts, and excellent resistance to cracking upon thermal cycling. Alumina trihydrate may be utilized as a filler to obtain the necessary nontracking characteristics. Fillers, such as particulated quartz may be used to closely match the coefficient of thermal expansion of the cast resin material with that of its metallic inserts.

The bushing assembly 10 shown in FIG. 1 is illustrated with the shoulder or flange 18 being an integral part of the cast body portion 12. However, the same basic structure shown in FIG. 1, except with the flange 18 being formed of a metallic insert embedded in the body member 12 at the time of casting would be equally suitable. Or, a metallic flange may be telescoped over body portion 12 of the bushing assembly 10 after it is cast, and secured thereto by a suitable adhesive, such as an epoxy resin. Also, instead of casting the weather sheds 34 integrally with the body member 12, it would be suitable to form the body portion 12 without weather sheds, and then enclose the weather end of the bushing within a suitable porcelain housing which includes weather sheds. If a porcelain weather housing is used, the space between the body portion and the porcelain housing may be filled with mineral oil, a resilient elastomeric sleeve, or any other suitable insulating means.

In order to more uniformly stress the insulation of body member 12, tubular, metallic capacitor plates 17, 17', 19, 19', 21, 21' and 23 are embedded within body member 12, in spaced relation about conductor 14. The capacitor plates are illustrated in FIG. 1 as being of the split or divided construction, having both axially and radially spaced tubular capacitor plates, but it is to be understood that the capacitor plates may be disposed in any desired arrangement, such as with all of the capacitor plates being radially spaced. Any desired number of capacitor plates may be used, depending upon the specific application for the bushing assembly. The specific diameters of the tubular capacitor plates, and their axial lengths are calculated to provide the desired capacitive relationships.

The outermost capacitor plate, which in this instance is capacitor plate 23, is electrically connected to ground 41, such as to the casing 24. When the mounting flange 18 is formed integrally with the cast body member 12, from the resinous insulation system, the grounding connection to the casing 24 may be provided by connecting capacitor plate 23 to a metallic washerlike member (not shown) embedded in the flange 18 about one of the openings for receiving a mounting bolt. Thus, when a mounting bolt is disposed through the opening, it will contact the washer member, and when the bushing is secured to the casing, the grounding of the outer capacitor plate will be completed to the casing through the mounting unit. This arrangement provides a convenient test point for checking the power factor, and thus the electrical condition of the bushing, by removing the bolt disposed through the opening which is associated with the washer member. If a metallic mounting flange is used, the outermost capacitor plate 23 may be connected directly to the metallic flange, which will ground the capacitor plate when the metallic flange is mounted on the casing 24.

The distribution of electrical stress within the solid insulation of the body member 12 is dependent upon the positions of the tubular capacitor plates, and the positions of the tubular capacitor plates within the body member 12 is thus critical. When the conductor 14 and capacitor plates are placed within a bushing mold, prior to the introduction of the casting resin system, it is of the utmost importance that the capacitor plates maintain their preplaced positions. Further, the capacitor plates should not be deformed and moved during the shrinkage of the casting resin, which occurs when the resin system is cured to a solid.

Since the casting resin system necessarily must have a high-percentage of filler, such as filler for obtaining tracking resistance, and filler for obtaining the desired match of the coefficient of thermal expansion of the resin system to the metallic inserts, the resin system will exert a force against the capacitor plates as it is introduced into the mold. The capacitor plates, therefore, must have sufficient mechanical strength to resist the force of the resin system, and this strength must not be achieved by substantially increasing the wall thickness of the capacitor plates, or complicating their manufacture, which would increase their manufacturing cost. In addition to possessing good mechanical strength, the tubular capacitor plates must be constructed such that the resin system will tenaciously adhere thereto without any voids, and with a bond which will not develop circumferential cracks or voids between the capacitor plates and the resin system upon thermal cycling of the bushing assembly 10.

Figure 2A:
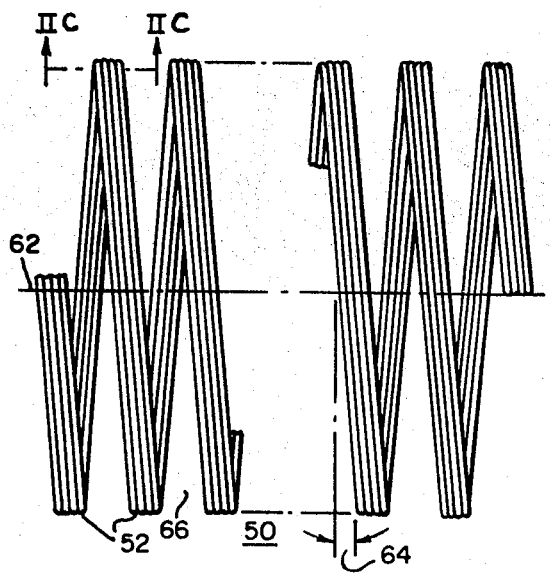
FIGS. 2A, 2B and 2C are elevational, end, and fragmentary cross-sectional views, respectively, of a capacitor plate structure constructed according to the teachings of the invention, which may be used in the bushing assembly shown in FIG. 1.
Figure 2B:
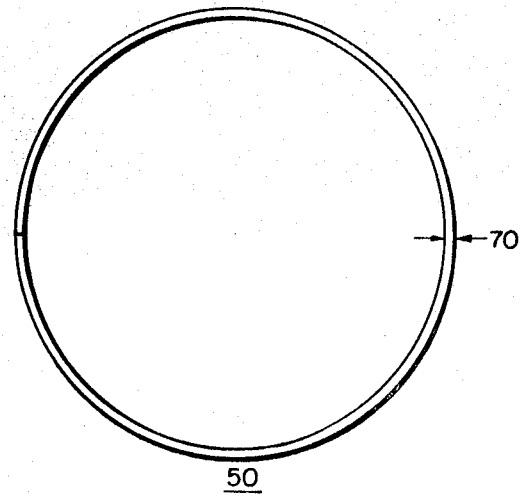
Figure 2C:
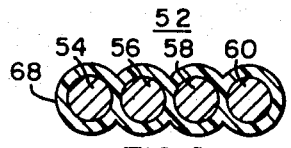

FIGS. 2A, 2B and 2C are elevational, end and fragmentary cross-sectional views, respectively, of a capacitor plate 50 constructed according to a first embodiment of the invention, which construction may be used for the capacitor plates in the cast condenser bushing 10 shown in FIG. 1.

Tubular capacitor plate 50 includes a plurality of axially spaced turns 52 formed of electrically conductive material, which in this embodiment of the invention is a plurality of small metallic wires. Four wires 54, 56, 58 and 60 are used for purposes of example, but any desired number of wires may be used. FIG. 2C is a cross-sectional view of a turn 52, taken in the direction of arrows IIC—IIC. The metallic wires, which should be good electrical conductors, such as copper or aluminum, spiral together in a collimated group, axially adjacent one another about a longitudinal axis 62, with a predetermined angle 64 relative to a line perpendicular to axis 62, and a predetermined space 66 between adjacent group turns.

The wires of the group are closely axially spaced and bonded together with bonding means 68, as best illustrated in FIG. 2C, with the bonding means 68 extending between the wires or turns of the group, to provide a high-strength tubular capacitor plate 50. It is important that the bonding means 68 extend only between the wires or turns of a group, and not between the group turns, which form the turns 52 of the tubular capacitor plate 50, in order to preserve the opening 66 through the wall of the tubular capacitor plate 50, through which the resin system of the cast body portion of the bushing may pass when the capacitor plate 50 is being cast into a bushing assembly. The opening 66 is important as it insures that a void-free bond will be created between the tubular capacitor plate 50 and the casting resin system, when the resin system is cured to a solid.

The tubular capacitor plate 50 may be constructed with a very thin wall dimension or thickness 70, while obtaining a self-supporting, high strength structure which may be held in the desired location within a casting mold without deformation, by utilizing wires of copper, aluminum, or other electrical conductors, having a relatively small outside diameter, such as wires in the range of 26–41 A.W.G. The wire size determines the wall thickness 70 and the number of wires in a group determines the width of the group. A spacing of about 0.1 to 0.125 inch will enable free movement of the liquid casting resin through the wall portion of the tubular capacitor plate 50, without deleteriously affecting the function of the structure as a capacitor plate. However, other spacing dimensions may be used, depending upon the width of a group turn.

An excellent, low cost method of forming capacitor plate 50 is to use the filament winding technique, using metallic wires instead of insulating filaments. The desired numbered plurality of wires are pulled from their respective spools through a bath of the bonding resin, passed through collimating means, and then wound about a mandrel having the required outside diameter for the specific capacitor plate being constructed. The capacitor plate 50 may be wound to the desired length, or a longer tubular member may be formed which is subsequently cut into a plurality of tubular members each having the desired length dimension.

The bonding resin is cured while the structure is still on the mandrel, at room temperature or in an oven, with the time and temperature depending upon the specific bonding resin selected. A collapsible mandrel may be used to facilitate the removal of the capacitor plate 50 after the bonding resin has been cured.

Any high-strength bonding resin may be used which is compatible with the casting resin of which the body portion of the bushing is formed, with the thermosetting epoxy resin systems being excellent. Thermoplastic resins may be used if their softening temperature is well above the pouring and curing temperature of the cast resin system used for the body portion of the bushing, and if they are chemically compatible with the casting resin used for the body portion of the bushing.

Figure 3A:
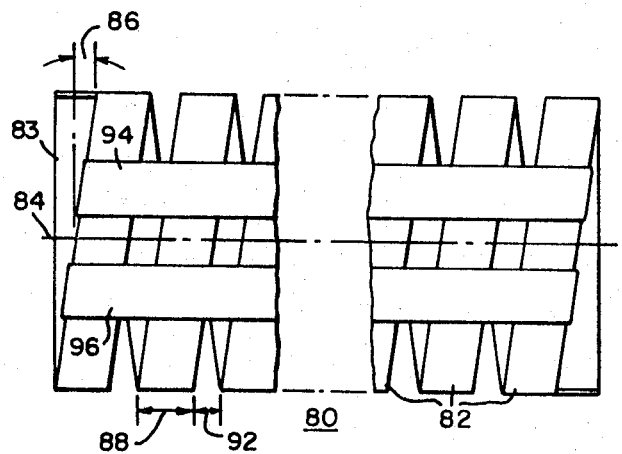
FIGS. 3A and 3B are elevational and end views, respectively, of a capacitor plate constructed according to another embodiment of the invention, which may be used in the bushing assembly shown in FIG. 1.
Figure 3B:
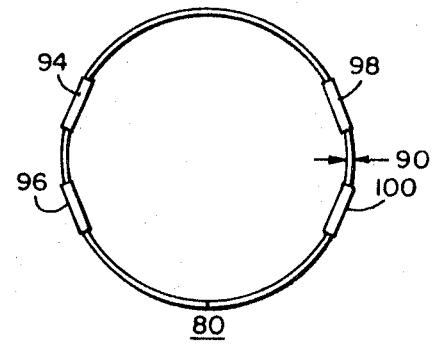

Instead of forming the turns of the tubular capacitor plate from a plurality of small diameter wires, it would also be suitable to utilize a single conductor by forming the tubular capacitor plate from a metallic strip having the desired width and thickness dimensions. This embodiment of the invention is illustrated in FIGS. 3A and 3B, which are elevational and end views, respectively, of a tubular capacitor plate 80.

Tubular capacitor plate 80 has a plurality of turns 82 formed of a conductive strip 83, such as copper or aluminum, having a width dimension indicated by reference numeral 88, and a thickness dimension indicated by reference numeral 90. Electrically conductive strip 83 spirals about longitudinal axis 84, and has a predetermined angle 86 relative to a line perpendicular to the axis 84. A predetermined spacing 92 is provided between adjacent turns 82 of the conductive strip 83, with spacing 92 preferably being in the range of about 0.1 to 0.125 inch, although other dimensions would be suitable.

The dimensions of electrically conductive strip 83 are selected to provide the desired wall thickness of the tubular capacitor plate 80, and the number of conductor turns therein, with a thickness dimension 90 in the range of about 0.03125–0.0625 inch and a width dimension 88 in the range of about 0.1875–0.375 inch being suitable for most applications.

The necessary structural strength for tubular capacitor plate 80 is provided, while maintaining openings in the wall portion of the tubular capacitor plate 80, by bonding means 94, 96, 98 and 100 disposed between the turns 82, to bond the turns into a self-supporting structure. As illustrated in FIGS. 3A and 3B, the bonding means 94, 96, 98 and 100 may each be longitudinally continuous, and each circumferentially spaced from one another, and the bonding means may extend across the turns, as well as between the turns, to reinforce and strengthen the tubular capacitor plate 80 and insure that it will maintain its preplaced position within a casting mold without movement or deformation when casting resin is introduced therein. The spacing 92 between adjacent turns 82 of tubular capacitor plate 80 enables the casting resin to flow therethrough and embed the tubular capacitor plate without producing voids or cracks between the plate and the casting resin.

The bonding means 94, 96, 98 and 100 preferably contain a filler selected to provide a pastelike consistency which enables the bonding means to be applied and maintained in the applied position without running, while the bonding means is being cured to a tough solid.

The conductive strip 83 may be conveniently wound on a mandrel to length, or it may be wound to a much greater length and cut into a plurality of tubular capacitor plates, as desired. After winding the conductive strip 83 with a desired predetermined spacing 92 between its turns, the bonding means is applied between the turns at a plurality of circumferentially spaced locations, and the bonding means is cured, either at room temperature, or in an oven, depending upon the specific resin selected for the bonding means, while the capacitor plate assembly is still on the winding mandrel. A collapsible mandrel may be used to facilitate removal of the tubular capacitor plate 80 therefrom, after the cure of the bonding means. A highly filled epoxy resin system would be excellent for the bonding means, but other resinous systems may be used, as long as they retain their mechanical strength at the pouring and curing temperature of the casting resin system, and which are chemically compatible with the casting resin of the main body portion of the bushing.

In summary, there has been disclosed new and improved electrical insulating bushing assemblies of the cast, condenser type, utilizing one or more tubular capacitor plates to grade the electrical stresses across the solid insulating portion of the bushing. The tubular capacitor plates disclosed herein are easily manufactured for a relatively low-cost, having a continuous spiraled opening, or a plurality of discrete, discontinuous spiraled openings, between the ends of the tubular capacitor plates which opening or openings enable the casting resin to extend therethrough and insure void-free, crack-free bonding between the cast resinous system of the body portion of the bushing and the tubular capacitor plates. Further, the tubular capacitor plates are constructed to have sufficient mechanical strength to maintain their preplaced mold positions without deformation as the casting resin is introduced into the mold and cured, with the high strength being due to an insulating, bonding resin, rather than resorting to thick wall dimensions for the capacitor plate. Metallic painting, spraying, or coating of insulating structures, as often used in the prior art to obtain tubular capacitor plates, is eliminated by a construction in which metallic material is wound directly into a tubular capacitor plate, directly forming the metallic portion of the capacitor plate, as well as the desired opening or openings in the wall portion thereof, by strategically spacing the turns of the conductive material.

We claim as our invention:

1. An electrical insulating bushing assembly adapted for mounting through an opening in the casing of electrical apparatus, comprising:

a body member having first and second ends, said body member being formed of a cast solid electrical insulating material, an electrical conductor disposed in said body member and extending between the first and second ends thereof, at least one tubular member formed of a plurality of turns of electrically conductive material, said turns being axially spaced in a predetermined pattern across the length dimension of said tubular member to provide openings through the wall of said tubular member, and bonding means disposed between certain of said turns, bonding said turns into a unitary, self-supporting tubular structure, while maintaining certain of the openings in the wall of said tubular member, said at least one tubular member being embedded in said body member, in spaced relation about said electrical conductor to provide a capacitor plate, with the cast solid electrical insulating material of said body member extending through the openings in the wall of said tubular member.

2. The electrical insulating bushing assembly of claim 1 wherein the turns of the at least one tubular member are formed of a plurality of metallic wires which spiral together in a collimated group with a predetermined space between adjacent group turns, and wherein the bonding means bonds the turns in the group together while maintaining the predetermined space between adjacent group turns, to provide the opening in the wall of the tubular member through which the solid electrical insulating material of the body member extends.

3. The electrical insulating bushing assembly of claim 2 wherein the bonding means is circumferentially continuous between adjacent turns within the group.

4. The electrical insulating bushing assembly of claim 1 wherein the turns of the at least one tubular member are formed of metallic strip material having a width dimension substantially greater than its thickness dimension, with the thickness dimension of the metallic strip forming the wall of the tubular member.

5. The electrical insulating bushing assembly of claim 4 wherein the turns of metallic strip material have a predetermined angle relative to the axis of the tubular member, and a predetermined space between adjacent turns across the length dimension of the tubular member, and wherein the bonding means is disposed between the turns in a circumferentially discontinuous manner, to bond the turns together and provide a self-supporting tubular structure, and also maintain openings in the wall portion of the tubular member through which the solid insulating material of the body member extends.

6. The electrical insulating bushing assembly of claim 4 wherein the turns of metallic strip material have a predetermined angle relative to a line perpendicular to the axis of the tubular member, and a predetermined space between adjacent turns across the length dimension of the tubular member, and wherein the bonding means bonds the turns together at a plurality of longitudinally aligned, circumferentially spaced locations, to maintain the openings in the wall portion of the tubular member through which the solid insulation of the body member extends.

* * * * *